United States Patent
Roller

(10) Patent No.: US 10,546,215 B2
(45) Date of Patent: Jan. 28, 2020

(54) SYSTEM AND METHOD FOR DETECTING POTENTIAL MATCHES BETWEEN A CANDIDATE BIOMETRIC AND A DATASET OF BIOMETRICS

(71) Applicant: Digital Signal Corporation, Chantilly, VA (US)

(72) Inventor: Christopher D. Roller, Fairfax, VA (US)

(73) Assignee: StereoVision Imaging, Inc., Calabasas, CA (US)

( * ) Notice: Subject to any disclaimer, the term of this patent is extended or adjusted under 35 U.S.C. 154(b) by 615 days.

(21) Appl. No.: 14/667,925

(22) Filed: Mar. 25, 2015

(65) Prior Publication Data

US 2015/0278398 A1 Oct. 1, 2015

Related U.S. Application Data

(60) Provisional application No. 61/972,366, filed on Mar. 30, 2014.

(51) Int. Cl.
*G06F 16/00* (2019.01)
*G06K 9/62* (2006.01)

(52) U.S. Cl.
CPC .................. *G06K 9/6224* (2013.01)

(58) Field of Classification Search
CPC .......... G06F 17/30958; G06F 17/3053; G06K 9/6215; G06K 9/00087; G06K 9/6224
See application file for complete search history.

(56) References Cited

U.S. PATENT DOCUMENTS

| | | | |
|---|---|---|---|
| 8,085,993 B2 * | 12/2011 | Jacobson | G06K 9/00885 382/116 |
| 2004/0258284 A1 * | 12/2004 | Daniel | G06K 9/00087 382/124 |
| 2006/0063156 A1 * | 3/2006 | Willman | C12Q 1/6886 435/6.14 |

(Continued)

OTHER PUBLICATIONS

Ng et al., On Spectral Clustering: Analysis and an algorithm; 2002; Papers.nip.*

(Continued)

*Primary Examiner* — Leslie Wong
(74) *Attorney, Agent, or Firm* — Toering Patents PLLC

(57) ABSTRACT

A system and method for detecting a potential match between a candidate facial image and a dataset of facial images is described. Some implementations of the invention determine whether a candidate facial image (or multiple facial images) of a person taken, for example, at point of entry corresponds to one or more facial images stored in a dataset of persons of interest (e.g., suspects, criminals, terrorists, employees, VIPs, "whales," etc.). Some implementations of the invention detect potential fraud in a dataset of facial images. In a first form of potential fraud, a same facial image is associated with multiple identities. In a second form of potential fraud, different facial images are associated with a single identity, as in the case, for example, of identity theft. According to various implementations of the invention, spectral clustering techniques are used to determine a likelihood that pairs of facial images (or pairs of facial image sets) correspond to the person or different persons.

21 Claims, 11 Drawing Sheets

(56) References Cited

U.S. PATENT DOCUMENTS

| | | | |
|---|---|---|---|
| 2008/0275862 A1* | 11/2008 | Liu | G06F 17/3071 |
| 2009/0028433 A1* | 1/2009 | Tolliver | G06K 9/6224 |
| | | | 382/173 |
| 2009/0253102 A1* | 10/2009 | Porikli | G09B 23/286 |
| | | | 434/6 |
| 2010/0208951 A1* | 8/2010 | Williams | G06K 9/2018 |
| | | | 382/117 |
| 2013/0010154 A1* | 1/2013 | Maeda | G06F 17/30259 |
| | | | 348/222.1 |
| 2014/0044322 A1* | 2/2014 | Kumar | G06K 9/00087 |
| | | | 382/124 |
| 2014/0072208 A1* | 3/2014 | Kenyon | G06K 9/80 |
| | | | 382/159 |
| 2015/0186752 A1* | 7/2015 | Xu | G06F 21/32 |
| | | | 382/128 |

OTHER PUBLICATIONS

Ann Marsden; Eigenvalues of the Laplacian and their relationship to the connectedness of a graph; Aug. 31, 2013; pp. 1-16.*

* cited by examiner

SYSTEM AND METHOD FOR DETECTING POTENTIAL MATCHES BETWEEN A CANDIDATE BIOMETRIC AND A DATASET OF BIOMETRICS

CROSS-REFERENCE TO RELATED APPLICATIONS

This application claims priority to U.S. Provisional Application No. 61/972,366, filed on Mar. 30, 2014, and entitled "System and Method for Detecting Potential Matches Between a Candidate Biometric and a Dataset of Biometrics," which is incorporated herein by reference in its entirety. This application is related to commonly owned U.S. patent application Ser. No. 14/667,929, filed herewith and entitled "System and Method for Detecting Potential Fraud Between a Probe Biometric and a Dataset of Biometrics," which is also incorporated herein by reference in its entirety.

FIELD OF THE INVENTION

The invention is generally related to processing biometric information and more particularly, to using spectral clustering to detect the relative strength of relationships or matches between two or more sets of biometrics, and in some instances, a candidate biometric and a dataset of biometrics.

BACKGROUND OF THE INVENTION

Determining whether a candidate biometric (e.g., facial image, fingerprint, genetic sequence, iris scan, or other biometric, or a reduced-dimensionality representation thereof) exists within a list, a database, or other dataset of biometrics can be a difficult task to automate, particularly when multiple biometrics of the same person exist within the dataset of biometrics. Adding minor differences among the respective biometrics presents further difficulties. For example, it may be desirable to automate a process for determining whether a facial image (or multiple facial images) of a person taken at point of entry corresponds to one or more facial images stored in a database of persons of interest (e.g., suspects, criminals, terrorists, employees, VIPs, "whales," etc.). In a similar vein, determining whether fraud exists in a dataset of biometrics, either as persons having multiple identities or persons posing under stolen identities, is a similarly difficult task.

What is needed is an improved system and method for detecting potential matches, and/or their relative strength, between a candidate biometric and a dataset of biometrics.

SUMMARY OF THE INVENTION

Systems and methods detect a potential match between a probe and a plurality of entries in a dataset, wherein each entry in the dataset comprises a plurality of gallery images, the method comprising receiving the probe, the probe comprising a plurality of probe images; for each respective entry in the dataset: spectrally clustering the plurality of probe images and the plurality of gallery images of the respective entry to determine whether the plurality of probe images and the plurality of gallery images collectively correspond to one or two clusters, and identifying a potential match between the probe and the respective entry when the plurality of probe images and the plurality of gallery images collectively correspond to one cluster.

These implementations, their features and other aspects of the invention are described in further detail below.

DETAILED DESCRIPTION

Figure 1:
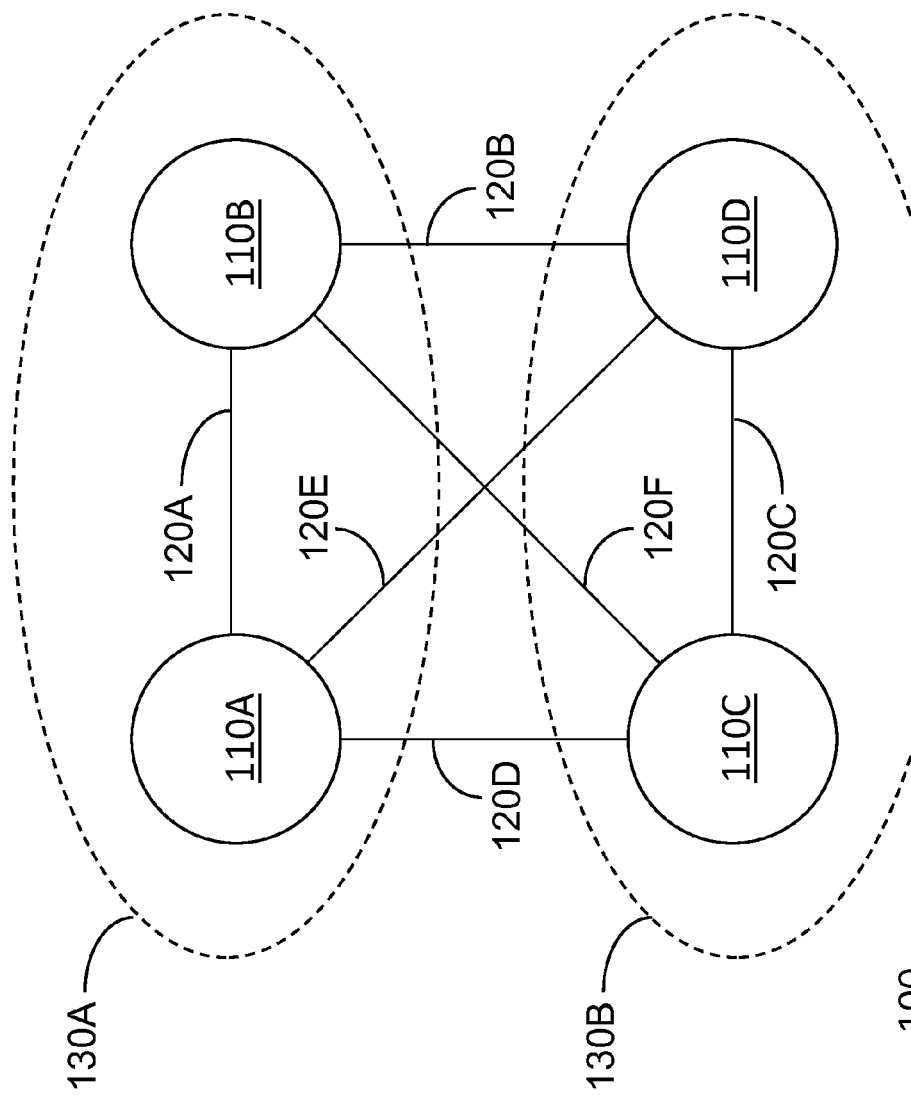
FIG. 1 illustrates a graph useful for describing various implementations of the invention.

Comparing one instance or set of biometric data or biometric information (hereinafter "biometrics") against another instance or set of biometrics is a difficult task to automate or implement on a computing platform. Matching algorithms for comparing biometrics seldom return binary responses (e.g., "match" or "non-match"). Instead, such matching algorithms typically return a score that corresponds to a degree of similarity, or other such measure, between the two sets of biometrics. For example, in the case of facial images of a person, a variety of factors contribute to the score between any two facial images of the same person including, but not limited to, pose, expression, lighting, and other factors. Seldom does a matching algorithm identify a "perfect match" between two facial images of the same person. Similar difficulties are experienced by matching algorithms for other forms of biometrics such as fingerprints, iris scans, voice recognition, etc. Typically, a system will set a score threshold for comparison, to determine a match/non-match based off a desired probability of false-alarm/probability of detection characteristic, for example based off a receiver operating curve (ROC).

Spectral clustering techniques utilize a spectrum (e.g., eigenstructure) of a similarity matrix of similarity scores to perform dimensionality reduction before clustering in fewer dimensions. The similarity matrix comprises a quantitative assessment of the relative similarity of each pair of biometrics in the dataset and is provided as an input. A description of spectral clustering may be found in Luxburg, Ulrike, "A Tutorial on Spectral Clustering," Max Plank Institute for Biological Cybernetics, Tubingen, Germany, which in incorporated herein by reference and attached as Appendix A.

Spectral clustering is typically employed to determine a structure of large graphs having hundreds of vertices, or more, with slight perturbations or differences between the vertices. Further, underlying data corresponding to edge weights between the vertices is typically considered to be deterministic or fixed.

In contrast, various implementations of the invention infer information on relatively small graphs, typically having fewer than 10-20 vertices, with relatively large perturbations between the vertices and multiple levels and/or types of information at each vertex. The underlying data corresponding to edges between the vertices is typically, but not necessarily, a random process. Because biometric scores often adhere to certain probability functions for match and non-match distributions, certain behaviors regarding the statistics of the similarity matrices can be inferred, and therefore certain properties of the various components of the spectral clustering problem, and its respective outputs, the clusters and cluster scores. Thus, a classification problem on biometrics is reduced to a clustering/decision problem with a separate receiver operating characteristic (ROC) curve.

A conventional biometric clustering problem involves a large biometric graph, which represents a collection of biometric data, with associations (edge weights). The common biometric term "gallery" is a set of data that can be represented as a biometric graph. This graph can be generalized with four different levels of organization that often represents the way in which the biometric graph is created and modified: supernodes, nodes, events, and items. An item refers to a piece of biometric information (or its reduced dimensionality representation) or metadata information. Typically, each item corresponds to a vertex in the biometric subgraph for the spectral clustering operations described herein. An event refers to a set or tuple of heterogeneous items that are associated with a person at a certain point in time, nominally from the same individual. For instance, an event could be the set of data gathered from an individual during a biometric enrollment. A supernode refers to a set of events which is identified within the database or graph as nominally belonging to the same individual. For instance, these could be associated with a common identifier, such as an ID number.

Figure 10:
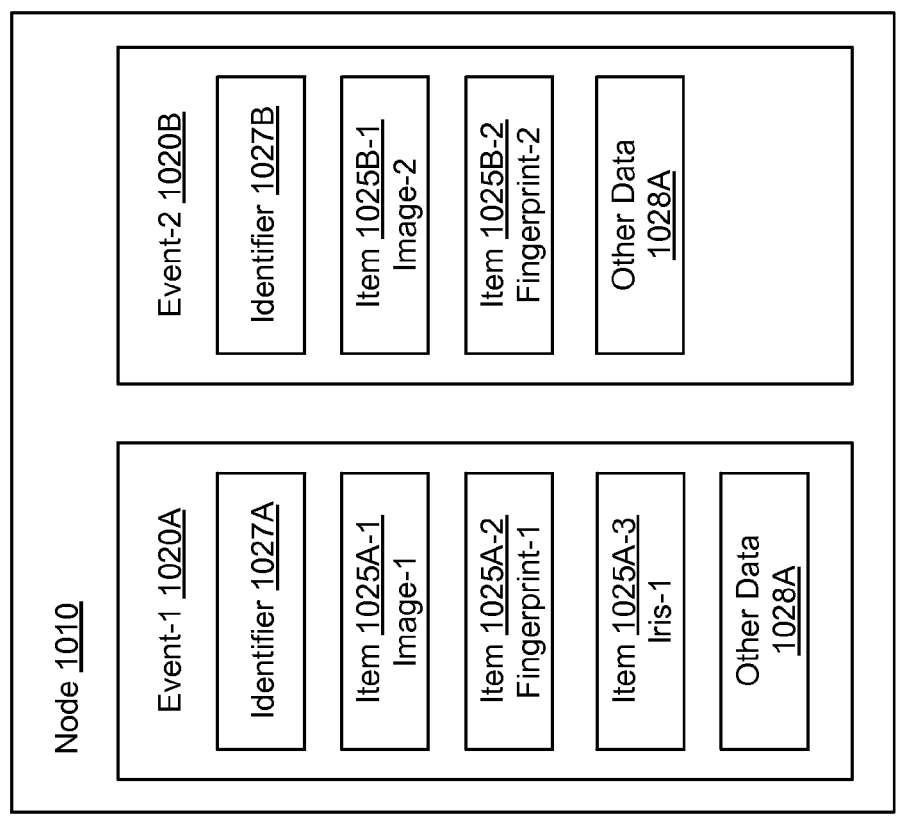
FIG. 10 illustrates various nomenclature useful for describing various implementations of the invention.

FIG. 10 illustrates a node 1010 including an event 1020A (also illustrated as "Event-1") and an event 1020B (also illustrated as "Event-2"). Event-1 includes an identifier 1027A, three items 1025A (illustrated as item 1025A-1 corresponding to "Image-1"; as item 1025A-2 corresponding to "Fingerprint-1"; and as item 1025A-3 corresponding to "Iris-1") and other data 1028A. As illustrated, Event-1 corresponds to three biometrics that were captured at a certain point in time from an individual associated with the identifier along with any other data captured, registered or recorded at that time. Event-2 includes an identifier 10278, two items 10258 (illustrated as item 1025B-1 corresponding to "Image-2"; and as item 1025B-2 corresponding to "Fingerprint-2") and other data 10288. As illustrated, Event-2 corresponds to two biometrics that were captured at a certain point in time from an individual associated with the identifier along with any other data captured, registered or recorded at that time.

Figure 11:
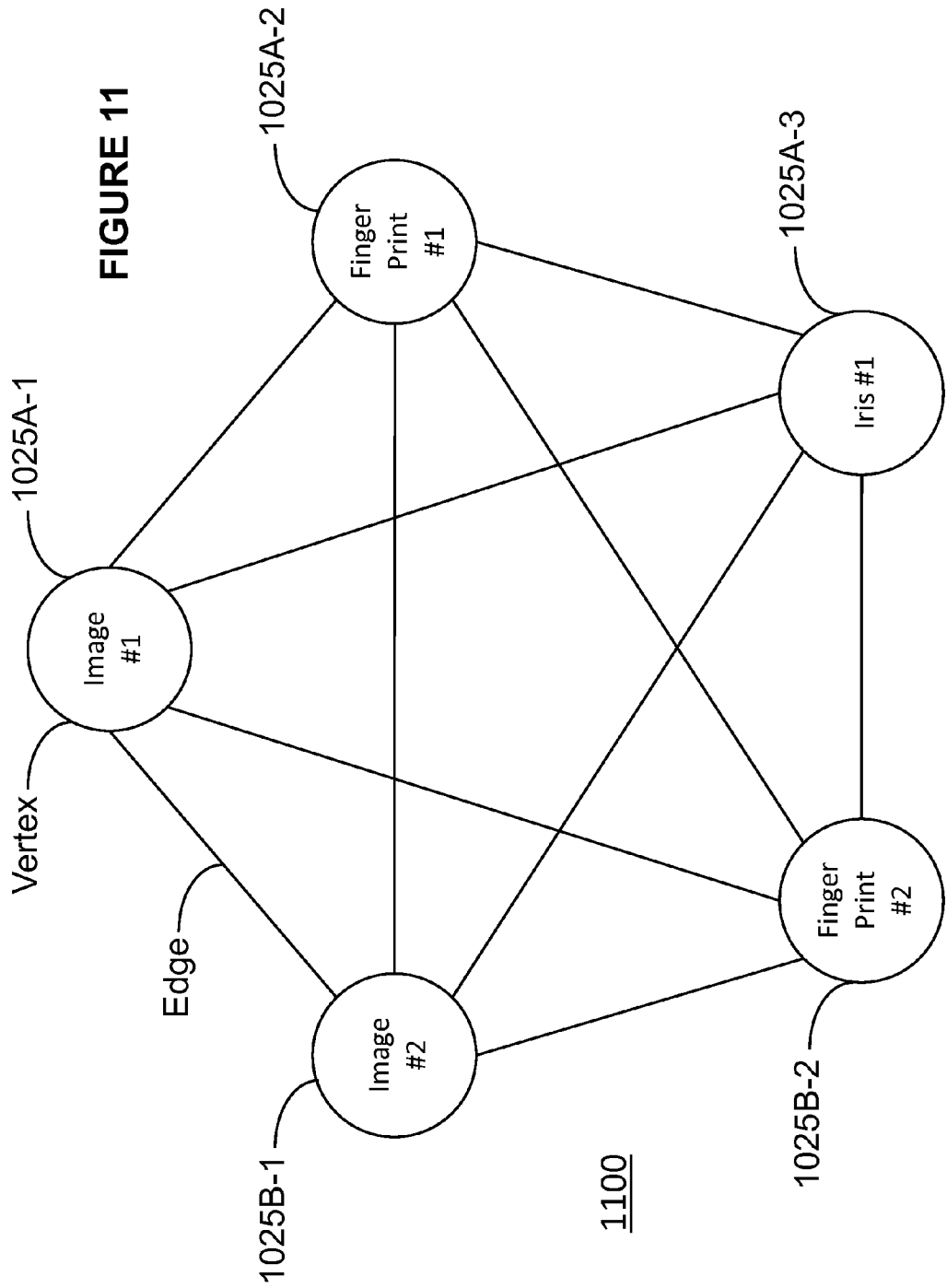
FIG. 11 illustrates a graph incorporating various elements of FIG. 9 in accordance with various implementations of the invention.

FIG. 11 illustrates a graph 1100 including various information from node 1010. As illustrated, graph 1100 includes five vertices and ten edges. In some implementations of the invention, each vertex (e.g., five circles in FIG. 11) corresponds to an item 1025 from node 1010 and each edge corresponds to a degree of similarity between various pairs of items 1025 in graph 1100.

In some cases, supernodes may include information collected from other individuals (e.g., in the case of error or fraud). Supernodes may also include (implicitly or explicitly) a-priori information from a system or system of systems, which can be used to enhance the spectral clustering solution. A node is a grouping within the supernode of items that belong to the same biometric. In some implementations of the invention, the graph of nodes or supernodes is considered to be fully connected, to the extent that biometrics comparisons can be computed between different types of biometrics. This organization is convenient for performing processing on very large graphs, but does not preclude other methods of organization considered within this application.

Various implementations of the inventions described herein employ spectral clustering in order to identify potential matches or non-matches, as the case might be, between candidate or probe biometrics and gallery or dataset biometrics. FIG. 1 illustrates a graph 100 useful for describing various implementations of the invention. Graph 100 includes a number of vertices 110 (illustrated in FIG. 1 as a vertex 110A, a vertex 110B, a vertex 110C, a vertex 110D). In some implementations of the invention, vertices 110 may range in number from two to twenty or more. In some implementations of the invention, vertices 110 may include hundreds or thousands of vertices as would be appreciated. Each vertex 110 in graph 100 is paired to each other vertex 110 in graph 100 by an edge 120 (illustrated in FIG. 1 as an edge 120A, edge 120B, edge 120C, edge 120D, edge 120E, edge 120F, edge 120G, edge 120H, edge 120I, edge 120J, edge 120K, edge 120L, edge 120M, edge 120N, and edge 120O). In some implementations of the invention, each edge 120 represents a distance measure between the vertex expressed as a score, $\mu$, and in some implementations, also an attendant uncertainty, $\sigma$. The score represents a distance measure (or the like) between vertices 110. According to various implementations of the invention, spectral processing techniques are used to determine whether vertices 110 are best organized into one or two clusters 130 (also referred to as K and illustrated in FIG. 1 as a cluster 130A and a cluster 130B and inclusive of various vertices 110).

According to various implementations of the invention, each vertex 110 corresponds to a biometric item. As referred to herein, a biometric is a measure of biometric information or biometric data. Biometrics are measures useful for determining a uniqueness of a bioorganism, typically, though not necessarily, a person. Biometrics include, but are not limited to, a facial image, an ear, an ocular image, a fingerprint, a palm print, a blood type, a genetic sequence, a heartbeat, a vocal signature, an iris scan, a gait, or other biometrics as would be appreciated. Within a given type of biometric, the method of capture and/or subsequent processing of the underlying biometric data may also be distinguished. For example, in the instance of facial images, the images may two-dimensional images, two-dimensional pose corrected images, three-dimensional images, etc. Biometrics and their attendant measures and/or captures are well known.

Figure 2:
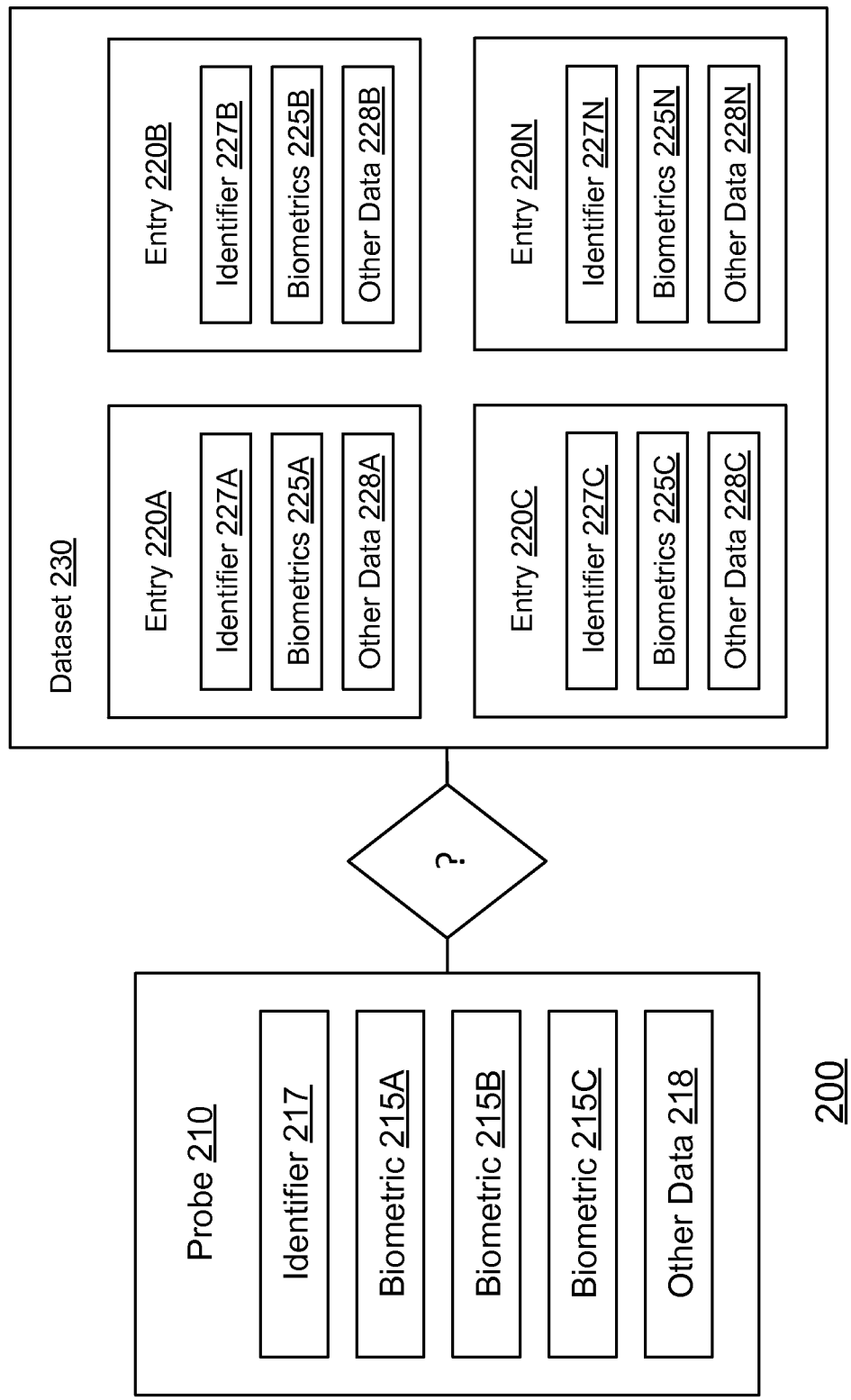
FIG. 2 illustrates a comparison useful for discussing various implementations of the invention.

FIG. 2 illustrates a comparison 200 useful for discussing various implementations of the invention. Comparison 200 tests a supernode 210 (referred to herein as probe 210) against one or more other supernodes 220, (referred to herein as entries 220 (illustrated in FIG. 2 as an entry 220A, and entry 220B, an entry 220C, . . . and an entry 220N) of a dataset 230. Probe 210 may include one or more probe biometrics 215 (illustrated as a probe biometric 215A, a probe biometric 215B and a probe biometric 215C) and entry 220 may include one more entry biometrics 225

(illustrated as an entry biometric 225A, an entry biometric 225B, and an entry biometric 225C). In some implementations of the invention, probe 210 may also include a probe identifier 217 which corresponds to a unique identifier of a bioorganism associated with probe 210. Likewise, entry 220 may also include an entry identifier 227. Biometrics 215, 225 may correspond to different captures of a same type of biometric (i.e., different facial images of the same person, for example) or different types of biometrics (i.e., a facial image, a fingerprint, etc.).

Figure 3:
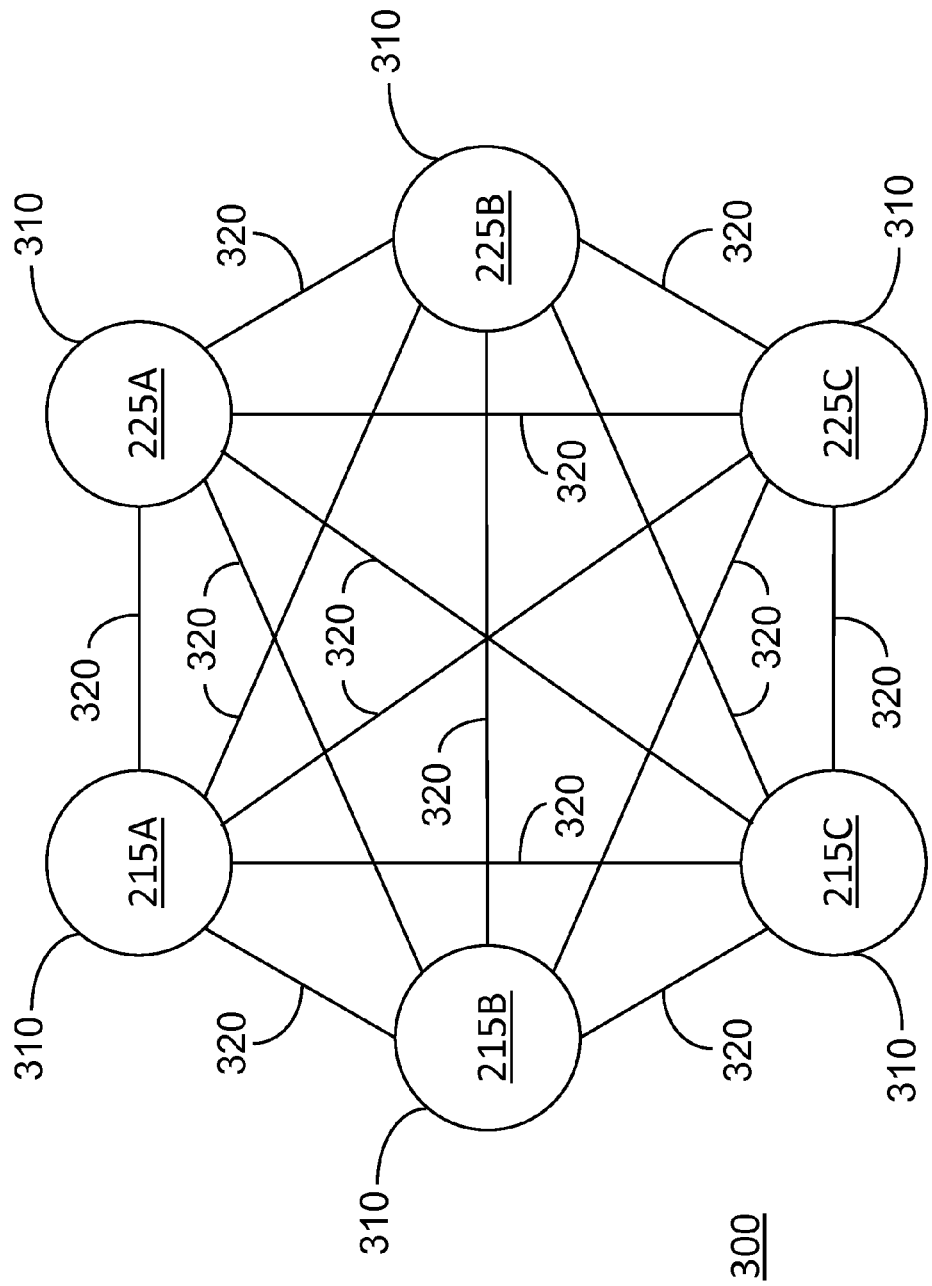
FIG. 3 illustrates a graph having vertices corresponding to each of one or more probe biometrics and to each of one or more entry biometrics according to various implementations of the invention.

According to various implementations of the invention, spectral clustering techniques are used to form a graph 300 having vertices 310 corresponding to each of one or more probe biometrics 215 and to each of one or more entry biometrics 225 as illustrated in FIG. 3. Edges 320 correspond to similarity scores and in some implementations, attendant uncertainties, between each pair of biometrics 215, 225 in graph 300. According to various implementations of the invention, spectral clustering is used determine whether vertices 310 belong in one cluster (in which case, vertices are deemed to be similar and associated with a same bioorganism) or two clusters (in which case, vertices are deemed to be dissimilar and associated with different bioorganisms). This is accomplished by scoring similarities between the underlying biometrics 215, 225 of each pair of nodes 310.

Various implementations of the invention may be used to determine whether to add probe 210 to dataset 230 of entries 220 as a new, unique entry 220 in dataset 230 or as additional biometrics to an existing entry in dataset 230. This may be accomplished by spectrally clustering probe 210 against each entry 220 to confirm whether or not probe 210 is unique in dataset 230 before being added. More specifically, spectral clustering techniques confirm that if the comparison of probe 210 with each entry 220 in dataset 230 result in two clusters, probe 210 is unique to dataset 230; otherwise if a comparison results in one cluster, probe 210 is similar to the corresponding entry 220.

Various implementations of the invention may be used to determine whether a probe 210 exists in dataset 230 of entries 220. In these implementations, probe 210 is spectrally clustered against entry 220 to identify whether any graph results in one cluster (probe 210 exists in dataset 230) or whether all graphs result in two clusters (probe 210 does not exist in dataset 230). These implementations may be useful for gathering biometrics of a person at, for example, a point of entry to determine whether the person (i.e., a probe) is included in a list (i.e., a dataset) of persons of interest (i.e., entries). These implementations of the invention vary widely from determining whether the person is a known terrorist or an employee or an invited guest to a party.

Various implementations of the invention may be used to determine whether a probe 210 is a better member of dataset 230 than is another entry, such as entry 220B. This type of operation is useful for creating, modifying, or destroying soft-hypotheses, useful for identity management.

Figure 4:
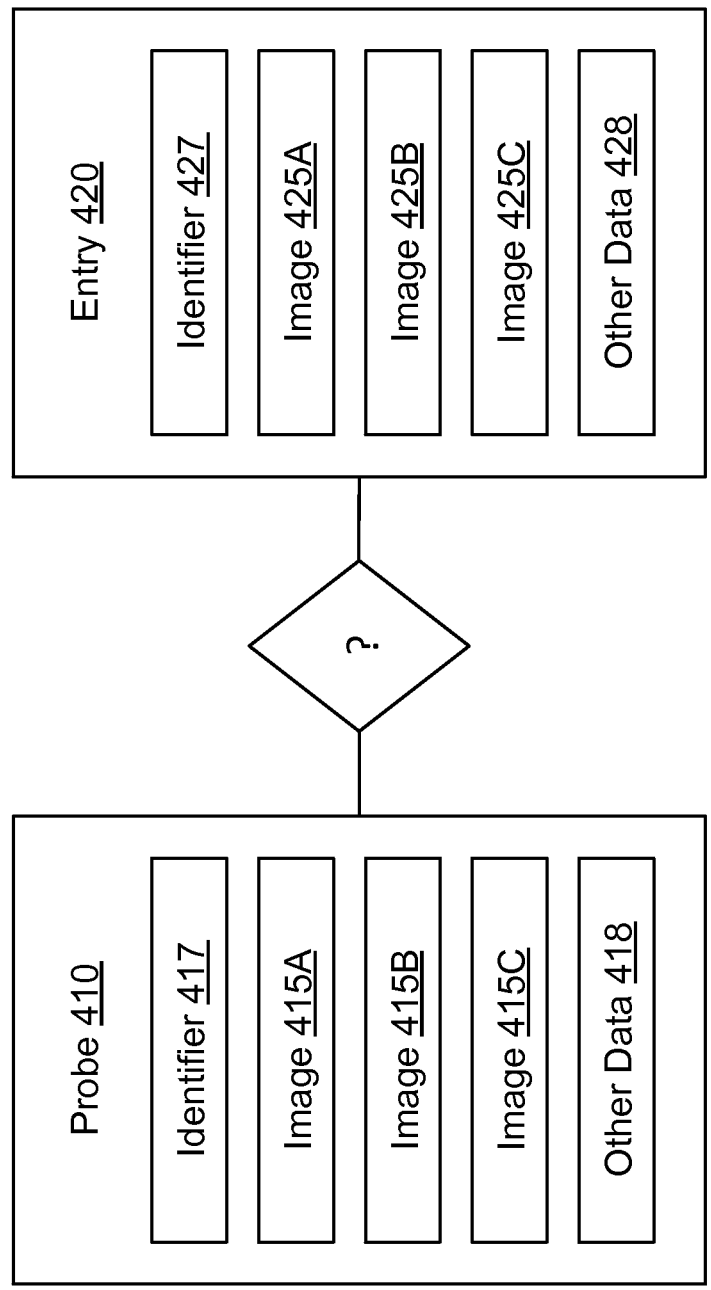
FIG. 4 illustrates a comparison between probe and an entry according to various implementations of the invention.

Various implementations of the invention are described herein with regard to biometrics in a form of facial images (or sometimes "images") of a person although these implementations are not limited to biometrics in this form as would be appreciated. FIG. 4 illustrates a probe 410 and an entry 420 (from a dataset not otherwise illustrated) according to various implementations of the invention. Probe 410 includes an identifier 417 and three facial images 415, namely an image 415A, an image 415B, and an image 415C.

Entry 420 likewise includes an identifier 427 and three facial images 425, namely, an image 425A, an image 425B, and an image 425C.

Figure 5:
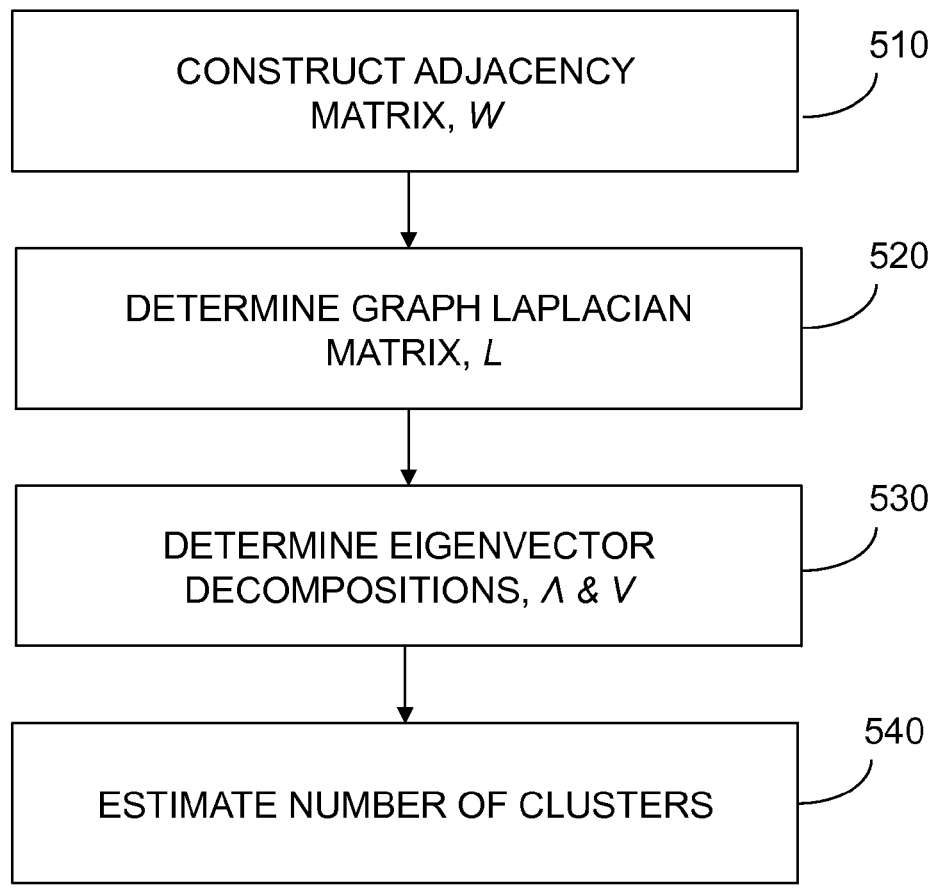
FIG. 5 illustrates an operation of spectral clustering in accordance with various implementations of the invention.

FIG. 5 illustrates an operation 500 of spectral clustering in accordance with various implementations of the invention. In an operation 510, an adjacency or affinity matrix, W, is constructed from similarity scores (corresponding to each of the graph edges) for each pair of images 415, 425 (corresponding to items or vertices). Typically, the adjacency matrix is N×N, where $N=N_1+N_2$ where $N_1$ corresponds to the number of images in probe node 410, and where $N_2$ corresponds to the number of images in entry node 420.

The similarity scores are a measure of likeness, relatedness or similarity between the paired images 415, 425. In biometric systems, these scores are typically formed as a distance measure between multidimensional biometric templates. Sometimes these distance measures are known, but sometimes they are unknown. In some implementations of the invention, images 415 are compared against each other as well as against images 425. In these implementations and for the example illustrated in FIG. 4, fifteen (i.e., six choose two) pairwise similarity scores are determined. Prior to being loaded in the adjacency matrix, in some implementations of the invention, the similarity scores may be weighted, scaled or subject to another function (e.g., thresholding, etc.). In some implementations, these weighting or scaling functions may be based on a variety of factors, including, but not limited to thresholding, a-priori scaling, linear weighted scaling, nonlinear (e.g.) kernel functions, or any data-dependent or node-dependent versions of these methods. The similarity scores are loaded into the adjacency matrix, W, with each element $W_{i,j}$ corresponding to the similarity score, or function thereof, of the (i,j) vertex pair.

In an operation 520, once the adjacency matrix, W, is determined, the N×N graph Laplacian matrix, L, may be determined. Graph Laplacian matrix, L, may be determined in a variety of ways. According to a first algorithm (i.e., for un-normalized spectral clustering), $L=D-W$, where the degree matrix, D is the diagonal of the row-sums of W, $d_{ii}=\Sigma^n W_{ij}$. According to a second algorithm (i.e., for normalized spectral clustering according to Shi/Malik), $L=I-D^{-1}W$. According to a third algorithm (i.e., for normalized spectral clustering according to Ng/Jordan/Weiss), $L=I-D^{-1/2}WD^{-1/2}$.

In an operation 530, an eigenvector decomposition of L is computed as $L=V\Lambda V^{-1}$ (or, since L is real and symmetric, $V\Lambda V^T$), where $\Lambda$ is the N×N matrix of sorted eigenvalues and where V is the N×N matrix of corresponding sorted eigenvectors.

According to conventional spectral clustering techniques, the nodes of the graph are organized into K clusters, where K is known in advance. However, according to various implementations of the invention, an actual number of clusters, K, in the graph of images is unknown and is sought to be estimated as either one cluster or two clusters. In an operation 540, a hypothesis test to estimating whether the graph includes one cluster or two clusters may be evaluated. This hypothesis test may be expressed as:

$$f(\Lambda, V) \underset{H_0}{\overset{H_1}{\gtreqless}} \eta$$

where $f(\Lambda, V)$ is a general hypothesis function of the graph Laplacian's eigenvalues, $\Lambda$, and the eigenvectors, $V$; where $H_0$ is the hypothesis that $K=2$ (two clusters); where $H_1$ is the hypothesis that $K=1$ (one cluster); and where $\eta$ is a threshold selected to satisfy one or more performance criteria. In some implementations of the invention, the hypothesis function may be formed using:

$$f(\Lambda, V) = \lambda_2 - \frac{0.5}{N-2}\sum_{i=3}^{N}\lambda_i$$

and $\eta=0$. Other hypothesis and thresholds may be used as would be appreciated. Due to the stochastic nature of the biometric scores and the resulting matrices, there is a performance tradeoff in setting the threshold for $\eta$. To minimize the error in estimating K, a slightly negative value for $\eta$ may be chosen. It has been found that this will increase the probability of estimating $K=2$ in the case of true clusters, at the slight penalty of sometimes erroneously estimating one cluster as two clusters. Other ROC-based tradeoffs can be performed, and can be optimized using training-based approaches (e.g. Support Vector Machines (SVMs)).

Using an estimate of K, the K smallest eigenvectors of the matrix V are selected into a matrix U. For this third algorithm, a normalized matrix, T, is used in place of U, where $t_{ij}=u_{ij}/\text{norm}(U(i,:))$. In the case of $K=2$, matrix U (or T, for algorithm 3) can then be clustered using the k-means algorithm, or simple thresholding of the second eigenvector. In some implementations of the invention, the estimate of the number of clusters may be used to determine whether probe 410 matches entry 420. More specifically, when the number of clusters is estimated to be one, probe 410 may be deemed to match entry 420, and hence, probe 410 may be deemed to be present in the corresponding dataset. When the number of clusters is estimated to be two, probe 420 may be deemed not to match entry 420, and hence, probe 410 may be deemed not to be present in the corresponding dataset. Thus, according to various implementations of the invention, further steps of spectral clustering techniques may be not necessary as would be appreciated.

According to various implementations of the invention, spectral clustering techniques may be used to detect certain instances of fraud or anomalies either within dataset 230 or as probes 210 (i.e., new data entries) are added to entries 220 in dataset 230. Fraud in dataset 230 typically exists in two forms. In a first form of potential fraud, a same facial image is associated with multiple identities (i.e., at least 2). As described herein, "same facial image" refers to two or more facial images being identified with a high degree of confidence as having captured respective visages of the same person. In this first form of fraud, the same person may be utilizing multiple identities. In a second form of potential fraud, different facial images are associated with a single identity. As described herein, "different facial images" refers to two or more facial images being identified with a high degree of confidence as having captured respective visages of different people. In this second form of fraud, one person may have stolen the identity of another person. According to various implementations of the invention, spectral clustering techniques are used to determine a likelihood that pairs of images (or pairs of image sets) correspond to the same facial image or different facial images.

Figure 6:
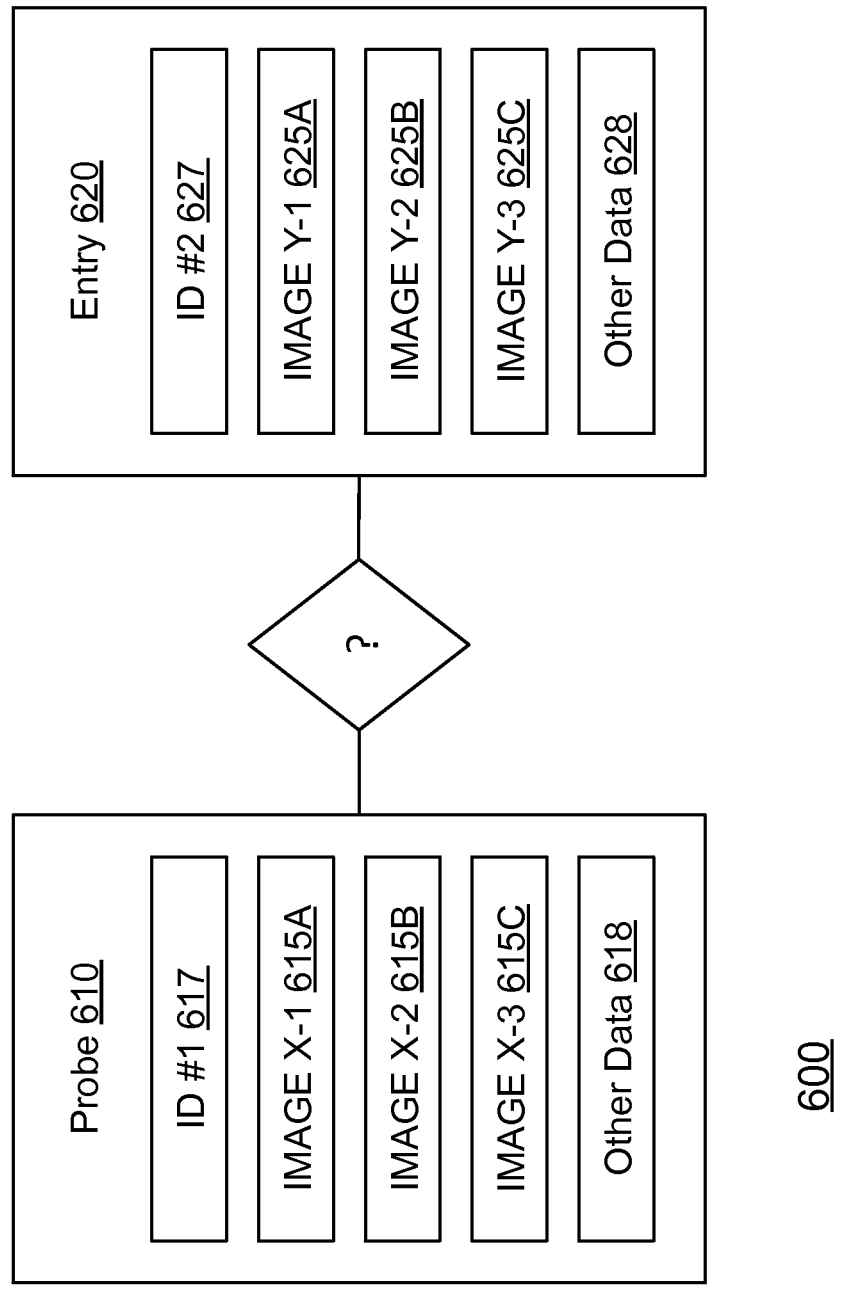
FIG. 6 illustrates a comparison between a probe node and an entry node in accordance with various implementations of the invention.

FIG. 6 illustrates a typical comparison 600 between a probe node 610 and an entry node 620. While discussed in this manner, probe 610 may just as easily be referred to as a first entry 610 and entry 620 may just as easily referred to as a second entry 620. Sticking with the language used above, probe 610 includes an identifier 617 (illustrated as "ID #1") and three images 615 (illustrated as image 615A for "Image X-1"; image 615B for "Image X-2"; and image 615C for "Image X-3"). As illustrated, probe 610 corresponds to a Person X having ID #1 and three biometrics, namely a first image of Person X referred to as Image X-1, a second image of Person X referred to as Image X-2, and a third image of Person X referred to as Image X-3. Similarly, entry 620 includes an identifier 627 (illustrated as "ID #2") and three images 625 (illustrated as image 625A for "Image Y-1"; image 625B for "Image Y-2"; and image 625C for "Image Y-3"). As illustrated, entry 620 corresponds to a Person Y having ID #2 and three biometrics, namely a first image of Person Y referred to as Image Y-1, a second image of Person Y referred to as Image Y-2, and a third image of Person Y referred to as Image Y-3. Comparison 600 corresponds to a "no fraud" case because each of the biometrics 615 belong to Person X and each of the biometrics 625 belong to Person Y and their respective identifiers are unique.

Figure 7:
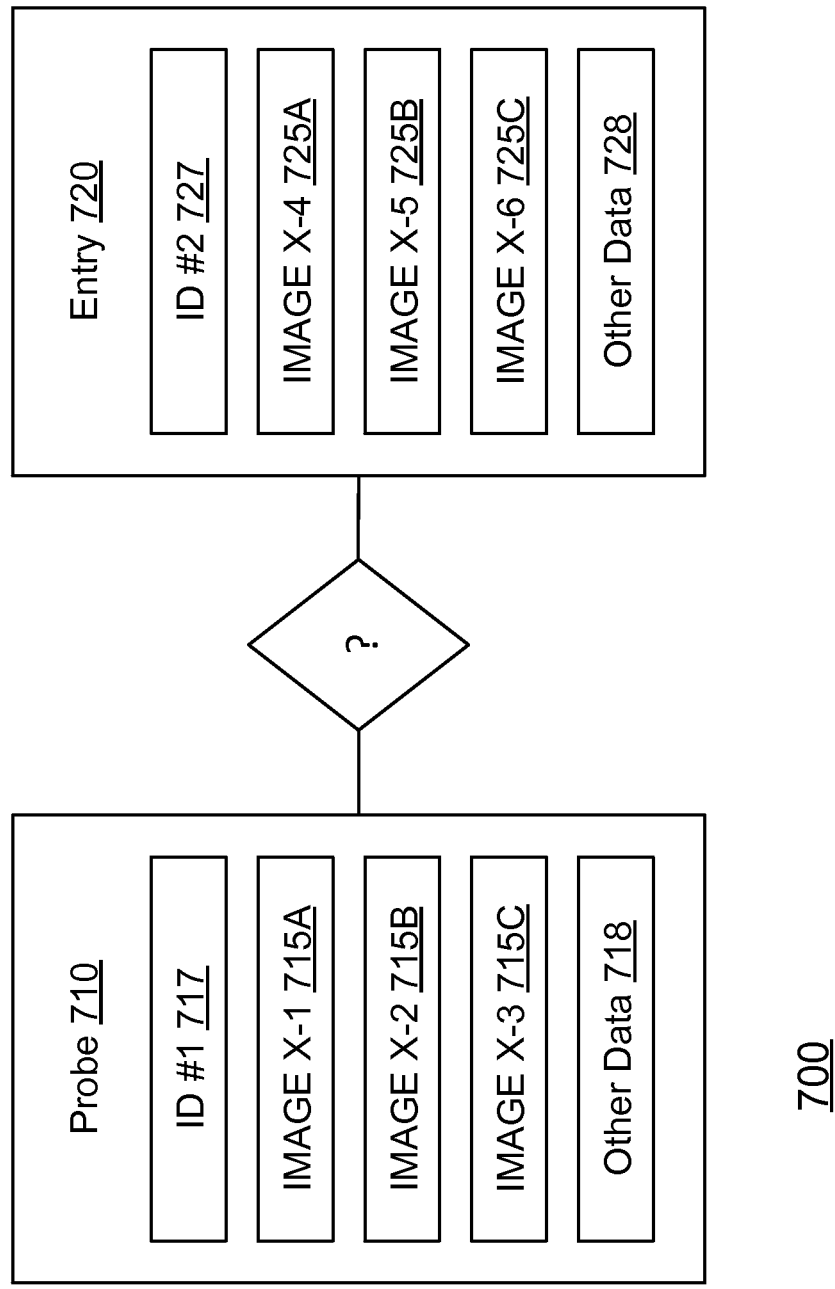
FIG. 7 illustrates a first form of potential fraud between a probe node and an entry node in accordance with various implementations of the invention.

FIG. 7 illustrates a first form of potential fraud. Probe node 710 includes an identifier 717 (illustrated as "ID #1") and three images 715 (illustrated as image 715A for "Image X-1"; image 715B for "Image X-2"; and image 715C for "Image X-3"). As illustrated, probe 710 corresponds to a Person X having ID #1 and three biometrics, namely a first image of Person X referred to as Image X-1, a second image of Person X referred to as Image X-2, and a third image of Person X referred to as Image X-3. Similarly, entry node 720 includes an identifier 727 (illustrated as "ID #2") and three images 725 (illustrated as image 725A for "Image X-4"; image 725B for "Image X-5"; and image 725C for "Image X-6"). As illustrated, entry 720 purportedly corresponds to a Person Y having ID #2 and three biometrics, namely a first image of purported Person Y referred to as Image X-4, a second image of purported Person Y referred to as Image X-5, and a third image of purported Person Y referred to as Image X-6. However, as illustrated, images 725 are all images of Person X. Comparison 700 corresponds to a form of potential fraud because each of biometrics 715 and biometrics 725 belong to Person X yet these sets of biometrics are associated with different identifiers. This form of potential fraud, where different identifiers are associated with biometrics belonging to the same person (e.g., Person X) is referred to "multiple identities." According to various implementations of the invention, spectral clustering should organize biometrics 715, 725 into a single cluster (e.g., $K=1$).

Figure 8:
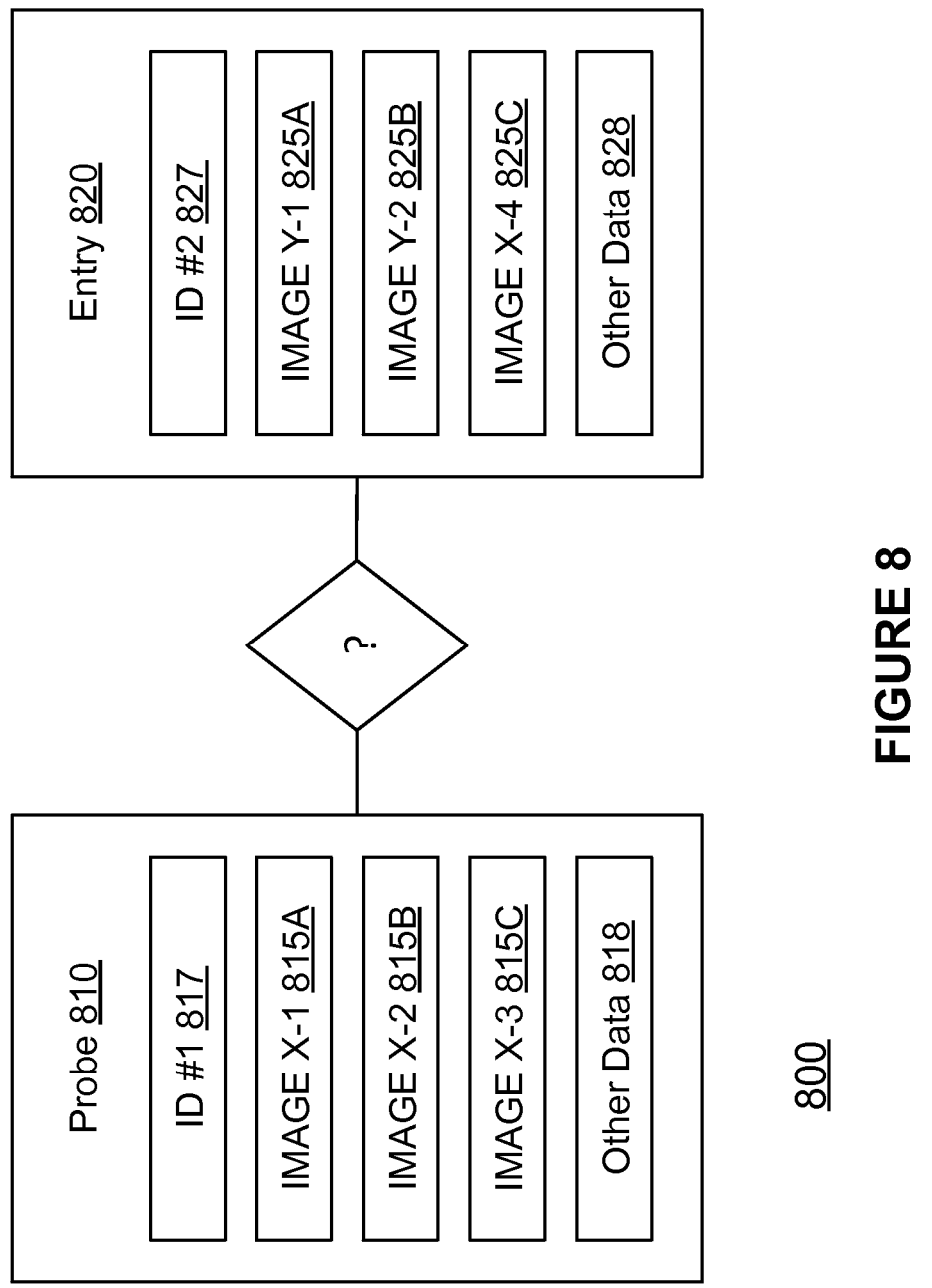
FIG. 8 illustrates a second form of potential fraud between a probe node and an entry node in accordance with various implementations of the invention.

FIG. 8 illustrates a second form of potential fraud. Probe node 810 includes an identifier 817 (illustrated as "ID #1") and three images 815 (illustrated as image 815A for "Image X-1"; image 815B for "Image X-2"; and image 815C for "Image X-3"). As illustrated, probe 810 corresponds to a Person X having ID #1 and three biometrics, namely a first image of Person X referred to as Image X-1, a second image of Person X referred to as Image X-2, and a third image of Person X referred to as Image X-3. Similarly, entry node 820 includes an identifier 827 (illustrated as "ID #2") and three images 825 (illustrated as image 825A for "Image Y-1"; image 825B for "Image Y-2"; and image 825C for "Image X-4"). As illustrated, entry 820 purportedly corresponds to a Person Y having ID #2 and three biometrics, namely a first image of Person Y referred to as Image Y-1, a second image of Person Y referred to as Image Y-2, and a third image of purportedly of Person Y referred to as Image X-4. However, as illustrated, images 825 include two images of Person Y and an image of Person X. Comparison 800 corresponds to a form of potential fraud because biometrics 825 of Person Y do not all belong to the same person and at least one of them (e.g. Image X-4) belongs to Person X. This form of potential fraud, where a single identifier is associated with different biometrics is referred to as "impersonation" or "stolen identity." According to various implementations of the invention, spectral clustering should organize biometrics 815, 825 into two clusters (e.g., K=2) that do not share a same boundary as the relevant identifiers 817, 827.

Figure 9:
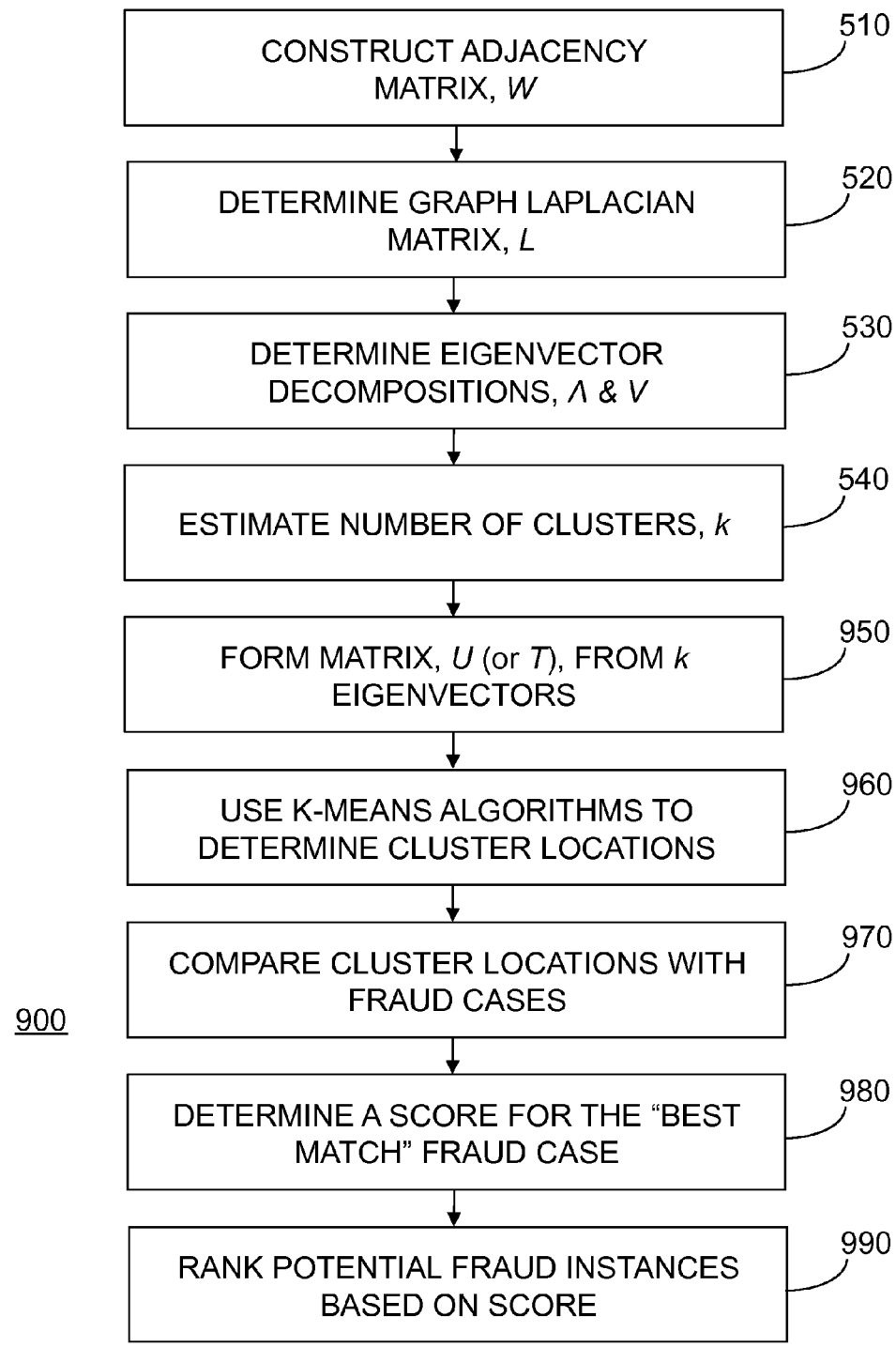
FIG. 9 illustrates an operation of spectral clustering in accordance with various implementations of the invention.

FIG. 9 illustrates an operation 900 for detecting potential fraud between probe (e.g., probes 610, 710, or 810) and entry (e.g., entries 620, 720 or 820). Operation 900 includes operations 510-540 as discussed above. With the estimate of the number of clusters, the eigenvalues, and the eigenvectors all determined, in an operation 950, a matrix U or a normalized matrix T (if the third algorithm is used) is formed from the k eigenvectors, $u_1 \ldots u_k$, corresponding to the k smallest eigenvalues. More specifically, the columns of matrix U correspond to eigenvectors $u_1 \ldots u_k$ as would be appreciated.

In an operation 960, a k-means algorithm may be used on U (or T as the case might be) to determine cluster locations, or in other words, to determine which nodes belong in which cluster(s). In some implementations of the invention, when K is estimated to be 2, the clustering may be accomplished using a simple +/− threshold test on the second eigenvector. Such a test returns a cluster indicator vector having values 1 or 2, corresponding to whether the node belongs in the first cluster or the second cluster.

In an operation 970, the cluster indicator vector is compared to each of the three categories of fraud: "no fraud," "multiple identities," or "stolen identity" to determine a "best match" fit. Not every cluster indicator vector will correspond to a fraud pattern vector; in this case, the cluster indicator vector can be classified as "unknown" or "other", For the biometric analysis problem, the clustering operation is subject to error. If the biometric matching algorithm produced perfect results (no false positives, no true negatives), then the W matrix would be a block-diagonal 1/0 matrix, and the cluster indicator vectors would be perfect. In the presence of statistical fluctuations, the cluster indicator vector may be wrong. One method of improving on performance is to score the resulting node-node comparison (or case) to indicate the relative confidence in the determination, based on the eigenstructure. The statistics of the biometrics scores are included within the eigenstructure, and a generalized scoring of the fraud cases, based on this eigenstructure, may be used, e.g., fraud_score=$g(\Lambda, V)$ In an operation 980, a score is determined for the best-match fraud case. In some implementations, this score is determined as $s_1 = \lambda_2 / \lambda_3$ (i.e., the second eigenvalue divided by the third eigenvalue). In some implementations of the invention, this score is determined as $s_2 = (\lambda_2 + \lambda_3)/(N-2)$. In an operation 990, the identified potential instance of fraud is ranked using the score against other identified potential instances of fraud (i.e., identified via various iterations of operation 900 of probe compared against entries in a given dataset).

In some implementations of the invention, the scores are compared against a threshold to eliminate scores (and their respective fraud cases) that are less than the threshold. Adjusting this threshold may be done to achieve an acceptable false-alarm rate (i.e., rate of incorrectly identifying a potential fraud case) at the expense of not detecting certain fraud cases as would be appreciated. The performance using the implied ROC curve (e.g., minimizing the percentage of false positive fraud cases while sacrificing the percentage of true fraud cases) is something that can be optimized based on prior statistics of match/non-match distributions, and the classification confusion matrices resulting from testing possible normal and fraud hypotheses against the clustering, classification, scoring and thresholding mechanism described above.

In some implementations of the invention, the ranked instances of potential fraud are subject to additional processing, including for example, being reviewed by human operators, preferably, though not necessarily, in rank order. Accordingly, the various thresholds discussed above may be adjusted so as to not over- or under-whelm, the human operators conducting this additional processing.

Again, while various implementations of the invention are discussed above with regard to images or facial images, other biometrics may be used as would be appreciated. In addition, in some implementations of the invention, other information, metadata (data not related to the person such as date, time, location associated with the biometric for example), other biodata (e.g., age, gender, weight, height, hair color, skin color, race, etc.) may be used to adjust or scale, for example, the scores determined in operation 890. In addition, in some implementations of the invention, spectral clustering over different types of biometrics may be used to further enhance matching or fraud detection. For example, matching or fraud detection based on a first biometric (e.g., images) may be further processed, either serially or in parallel or only those having scores that exceed a thresholds, by matching or fraud detection based on a second biometric (e.g., fingerprints). In some implementations of the invention, matching or fraud detection based on multiple types of biometrics may be performed simultaneously via the adjacency matrix as would be appreciated.

In some implementations of the invention, a large dataset 230 may be broken into multiple, smaller sub-datasets and offloaded to separate computing processors for, in effect, parallel processing. Ranked instances of potential fraud found in each of the sub-datasets may be combined in rank order to identify the instances of potential fraud in the dataset as a whole.

In some implementations of the invention, a probe list comprising a number of probes 210 may be compared against a dataset 230 as would be appreciated. In these implementations, the spectral processing techniques discussed above with regard to a single probe 210 may be iterated for each probe 210 in the probe list as would be appreciated.

While described herein in terms of various implementations, the invention is not so limited; rather, the invention is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A method for detecting a potential match between a probe and a plurality of entries in a dataset, wherein each entry in the dataset comprises a plurality of gallery images, the method comprising:

receiving the probe, the probe comprising a plurality of probe images;

for each respective entry in the dataset:

spectrally clustering the plurality of probe images and the plurality of gallery images of the respective entry to determine whether the plurality of probe images and the plurality of gallery images collectively correspond to one or two clusters, wherein spectrally clustering the plurality of probe images and the plurality of gallery images comprises:
    forming an adjacency matrix of biometric scores of a size (N1+N2) by (N1+N2), wherein N1 is a number of probe images and wherein N2 is a number of gallery images,
    determining a graph Laplacian based on the adjacency matrix,
    determining an eigenspace decomposition, including eigenvalues and eigenvectors, based on the graph Laplacian, and
    estimating a number of clusters based on the eigenspace, and
identifying a potential match between the probe and the respective entry when the plurality of probe images and the plurality of gallery images collectively correspond to one cluster.

2. The method of claim 1, wherein spectrally clustering the plurality of probe images and the plurality of gallery images comprises:
    assigning each of the plurality of probe images to an individual vertex in a graph;
    assigning each of the plurality of gallery images to an individual vertex in the graph; and
    determining a similarity score for each pair of vertices in the graph.

3. The method of claim 1, wherein determining a graph Laplacian comprises:
    determining the graph Laplacian as $L=D-W$.

4. The method of claim 1, wherein determining a graph Laplacian comprises:
    determining the graph Laplacian as $L=I-D^{-1}W$.

5. The method of claim 1, wherein determining a graph Laplacian comprises:
    determining the graph Laplacian as $L=I-D^{-1/2}WD^{-1/2}$.

6. The method of claim 1, wherein estimating a number of clusters comprises:
    comparing the eigenvalues or function thereof against a threshold.

7. The method of claim 5, wherein the threshold is a negative number.

8. The method of claim 1, wherein forming an adjacency matrix comprises:
    determining a similarity score between one of the plurality of probe images and one of the plurality of gallery images.

9. The method of claim 8, wherein the similarity score is a function of the biometric score.

10. The method of claim 8, wherein the adjacency matrix is pre-processed with a kernel.

11. The method of claim 1, wherein forming an adjacency matrix comprises:
    determining a similarity score between each pair of images in a set of images comprised of the plurality of probe images and the plurality of gallery images.

12. The method of claim 1, wherein the plurality of probe images comprise:
    a plurality of 2D images, a plurality of 2D pose corrected images, or a plurality of 3D images.

13. A method for detecting a potential match between a probe and a plurality of entries in a dataset, wherein each entry in the dataset comprises a plurality of gallery biometrics, the method comprising:
    receiving the probe, the probe comprising a plurality of probe biometrics;
    for each of the plurality of entries in the dataset:
    spectrally clustering the plurality of probe biometrics and the plurality of gallery biometrics of the entry to determine whether the plurality of probe biometrics and the plurality of gallery biometrics collectively correspond to one cluster or two clusters, wherein spectrally clustering the plurality of probe biometrics and the plurality of gallery biometrics comprises:
        forming an adjacency matrix of biometric scores of a size (N1+N2) by (N1+N2), wherein N1 is a number of probe biometrics and wherein N2 is a number of gallery biometrics,
        determining a graph Laplacian based on the adjacency matrix,
        determining an eigenspace decomposition, including eigenvalues and eigenvectors, based on the graph Laplacian, and
    estimating a number of clusters based on the eigenspace, and
    identifying a potential match when the plurality of probe biometrics and the plurality of gallery biometrics collectively correspond to one cluster.

14. The method of claim 12, wherein the plurality of probe biometrics comprises a first biometric type and a second biometric type, wherein the plurality of gallery biometrics comprises the first biometric type and the second biometric type, and wherein the first biometric type and the second biometric type are different from one another.

15. The method of claim 13, wherein the plurality of probe biometrics comprises biometric representations of a processed image, a fingerprint, a palm print, an iris scan, a 3D mesh, a genetic sequence, a heartbeat, a gait or a speech component.

16. The method of claim 13, wherein the plurality of probe biometrics is divided into separate homogeneous biometrics, the spectral clustering is performed for each biometric, and the results are combined, to improve performance.

17. The method of claim 16, wherein the combination is done in the eigenspace for each biometric or related component.

18. The method of claim 16, wherein the combination is done with a combination of the separate adjacency matrices for each biometric or related component.

19. The method of claim 16, wherein the combination is done on the resulting clusters, or a function of the clusters, for each biometric or related component.

20. The method of claim 15, where the processed image is a pose-corrected 2D image.

21. The method of claim 15, where the processed mesh is a pseudo-3D mesh created from a 2D image, or a plurality of 2D images.

* * * * *